United States Patent [19]

Vavreck et al.

[11] Patent Number: 5,268,756
[45] Date of Patent: Dec. 7, 1993

[54] GENERATION OF SYNCHRONIZATION SAMPLES FOR A DIGITAL PAL SIGNAL

[75] Inventors: Kenneth E. Vavreck, Maple Shade; Kevin J. Stec, Medford, both of N.J.

[73] Assignee: Panasonic Technologies, Inc., Princeton, N.J.

[21] Appl. No.: 859,843

[22] Filed: Mar. 30, 1992

[51] Int. Cl.⁵ ............................................... H04N 7/01
[52] U.S. Cl. ............................................ 358/140; 358/11
[58] Field of Search ............... 358/140, 11, 160, 138, 358/148

[56] References Cited

U.S. PATENT DOCUMENTS

| | | | |
|---|---|---|---|
| 4,568,963 | 2/1986 | Sakai et al. | 358/11 |
| 4,751,573 | 6/1988 | Kubota | 358/140 |
| 4,853,765 | 8/1989 | Katsumata et al. | 358/140 X |
| 4,868,656 | 9/1989 | Geiger et al. | 358/140 |
| 4,870,661 | 9/1989 | Yamada et al. | 358/13 X |
| 4,872,054 | 10/1989 | Gray et al. | 358/148 X |
| 5,168,359 | 12/1992 | Mills | 358/140 |

Primary Examiner—Victor R. Kostak

[57] ABSTRACT

A system for converting a digital component video signal having timing information contained therein to a digital composite video signal is described. The system has a decoder for extracting the timing information from the digital component signal, a digital memory means for storing portions of the desired digital composite signal, a memory control means for extracting the portions of said desired signal from the digital memory means in response to the timing information and a multiplexing means for combining the portions of the signal extracted from the digital memory in response to timing information of the digital component signal.

12 Claims, 2 Drawing Sheets

GENERATION OF SYNCHRONIZATION SAMPLES FOR A DIGITAL PAL SIGNAL

FIELD OF INVENTION

The invention relates to a system and method for converting a digital video component signal to a digital video composite signal.

BACKGROUND OF THE INVENTION

With the increase in the usage of digital technology in the TV/video industry, different digital video signal formats have emerged. These formats specify different attributes of a video signal.

With the advent of HDTV, the number of formats has grown further. In addition, because of differing requirements, any HDTV format will be quite different from the "old" NTSC/PAL/SECAM formats. The concurrent existence of multiple formats makes it desirable to convert from one signal format to another to facilitate use of newer equipment with the previously installed NTSC/PAL/SECAM format base.

An international format has been adopted for digital representation of a video component signal whose characteristics are described generally in Table 1 below.

TABLE 1

Encoding Parameters for Digital Component Signals

| Coded Signal | Y = 0.299R + 0.587G + 0.114B |
| | $C_R$ = 0.713 (R-Y) = 0.500R - 0.419G - 0.081B |
| | $C_B$ = 0.564 (B-Y) = 0.500B - 0.169R - 0.331G |

| Number of samples per line: | Total | Active |
|---|---|---|
| luminance (Y) | 858 | 720 |
| each color difference ($C_R$' $C_B$) | 429 | 360 |
| total number of samples | 1716 | 1440 |
| Sampling Structure | Orthogonal: $C_r$ and $C_b$ samples are co-sited with odd (1st, 3rd, 5th) Y samples in each line. | |

| Sampling frequency: | |
|---|---|
| luminance (Y) | 13.5 MHz nominal |
| each color-difference signal ($C_R$' $C_B$) | 6.75 MHz nominal (13.5 MHz total) |
| Correspondence between video signal levels and quantization levels: | |
| 8 bit system | |
| luminance signal (Y) | 220 quantization levels with the black level at level 16 and the peak white level at level 235. |
| each color-difference signal ($C_R$' $C_B$) | 225 quantization levels symmetrically distributed about the zero signal level 128. |

The relationship between video signals in the digital and analog domain for 525-line systems for the digital component system can be summarized by noting that of the 1716 sample values generated over 1716 clock intervals:

(a) 1440 multiplexed luminance and chrominance values are transmitted during each active line, one per clock interval;

(b) 8 of the remaining 276 clock intervals are used to transmit synchronizing information [as follows in (e) and (f)], the other 268 interface clock intervals may be used to carry ancillary information;

(c) the first of these 1716 interface clock intervals is designated line word 0 for the purpose of reference only (the 1716 sample words per total line are therefore numbered 0 through 1715).

(d) intervals through 1439, inclusive, contain video data—the interface clock intervals occurring during digital blanking are designated 1440 through 1715;

(e) intervals 1440 through 1443 are reserved for the end-of-active-video (EAV) timing reference;

(f) intervals 1712 through 1715 are reserved for the start of-active-video (SAV) timing reference; (g) the half amplitude point of the leading (falling) edge of the analog horizontal sync signal is coincident with a sample point which would be conveyed by word 1473 if carried across the interface.

More details about this signal can be found in specification CCIR 601 incorporated herein by reference.

There is also a growing consensus in the electronics industry supporting a format for digital representation of a video composite signal.

The video encoding parameter values for the digital composite signal are defined in Table 2 below. More details about this signal can be found in the following two documents incorporated herein by reference:

1) "Characteristics of Systems for Monochrome and Colour Television", CCIR Report 624-3 Volume XI, part 1, XVI Plenary Assembly, Dubrovnik, 1986; and 2) "Video Waveform Drawing", EIA RS170A. References are made to the RS170A composite video signal drawing for NTSC signals. For NTSC signals, the subcarrier used for the determination for the color frame is a continuous sinewave with the same instantaneous phase as the burst.

TABLE 2

Encoding Parameters for Digital Composite Signals

| Coded Signal | NTSC (525 line system) | | PAL (625 line system) | |
|---|---|---|---|---|
| Number of samples per line: | Total | Active | Total | Active |
| | 910 | 768 | 1135 | 948 |
| Sample Structure | Orthogonal | | Non-Orthogonal | |
| Sample Frequency | 14.31818 MHz | | 17.734475 MHz | |
| | (4 $F_{sc}$) | | (4 $F_{sc}$) | |
| Correspondence between signal levels and quantization levels: (in hexadecimal notation) 8 bit system | | | | |
| Blanking level | 3Ch | | 40h | |
| White level | C8h | | D3h | |
| Sync level | 04h | | 01h | |

It is clear from Tables 1 and 2 that the encoding parameters for the digital component and digital composite video signals are different, and therefore, video equipment operating in accordance with differing standards would be unable to exchange video data.

By way of further background, there are three levels of signals produced for color television. At the highest quality level, the video signal produced by the television camera has red (R), green (G), blue (B) signal components. At the next level, referred to as the component level, the video signals correspond to one luminance (Y) and two chroma signals, a signal designated CR and a signal designated CB. At the lowest level, the video signals are in the (United States) NTSC or (European) PAL format, which includes a luminance (Y) signal and two chroma signals, designated I (or U) and Q (or V). These are the digital NTSC (or PAL) components, where the chroma signals are modulated and added to the luminance signal to form the digital composite signal. As used herein, the term digital component signal refers to a digital representation of the color video signal at the component (Y, CR, CB) level, and the term digital composite signal refers to a digital representation of the color video signal at the composite (NTSC, PAL) level. It will be understood by those skilled in the art that the invention described and claimed herein is applicable for us in both the United States (NTSC) and European (PAL) color television systems, and references to the Y, CR, CB, U and V signals and PAL composite signal are for illustrative purposes only and should be understood to encompass the corresponding representations of the corresponding signals under the NTSC standards.

There is a need to convert digital video signals between the video component signal format and the video composite signal format. The video component signal is a better quality signal and can be manipulated more easily than the video composite signal. Thus, the digital component signal format is usually used by professionals for production work for doing such things as inserting computer graphics, resizing a picture, overlapping, matting and creating special effects. Once the production work is completed, the digital component signal format must be converted to the digital composite signal format since it is more closely related to the PAL or NTSC standards.

Conversion between the digital component signal format and the digital composite signal format requires several steps. One approach, as described in the prior art for conversion from digital component to digital composite is as follows:

1) Matrixing of digital component signal components to digital composite signal components in accordance with the following mathematical relationship (wherein $D_O$ indicates the output digital composite signal and $D_I$ is the input digital component signal):
(1) $Y_{DO} = 0.625\ Y_{DI}$
(2) $I = 0.625\ [(1.031)\ CR + (-0.477)\ CB]$
(3) $Q = 0.625\ [(0.699)\ CR + (0.730)\ CB]$ 2) Band limiting of the chroma components:
(a) low pass filter I
(b) low pass filter Q 3) Modulation of the 3.58 MHz carriers by the chroma components and forming the composite signal:

NTSC COMPOSITE VIDEO = $Y_{DO}$ + I cos [$2\pi$(3.58 MHz)t] + Q sin [$2\pi$(3.58 MHz)t]

The system for producing the digital component signal format uses a clock frequency of 13.5 MHz. On the other hand, the system for producing the digital composite signal format uses a clock frequency of 14.318 MHz. Thus, in converting from one signal format to the other, the differences in clock frequencies must be taken into account. Due to the differences in clock frequency, some of the digital samples in one of the signals may be lost; therefore, interpolation techniques are required to prevent the loss of information. An interpolation method and apparatus are detailed in U.S. Pat. No. 5,057,911, assigned to the present assignee, the teachings of which are hereby incorporated by reference.

The chroma signal portion of the video signal in the digital component signal format has a bandwidth of 2.75 MHz, whereas the chroma signal portion of video signals in the digital composite signal format has a maximum bandwidth of 1.3 MHz. The chroma signal must be combined during the conversion process according to the mathematical relationship set forth above to produce the proper chroma signals for the digital composite format into which the digital component signal is to be converted. Differences in signal levels for each format must be taken into account by providing gain adjustments for the signals. Finally, in the conversion from digital component format to the digital composite signal format, the chroma signal must be modulated and the resulting composite signal corrected for DC offset.

Prior art systems required a relatively large amount of hardware because of the complexity of the conversion. It is therefore an objective of the present invention to provide a system for conversion between the digital component and digital composite signal formats which reduces the amount of hardware previously required.

It is another objective of the present invention to provide a relatively simple method for converting from digital component to digital composite signals.

It is yet another object of this invention to facilitate the communication of video information between two dissimilar digital video streams.

It is a further object of the invention to provide for an interface between two video equipment units having differing input and output characteristics.

SUMMARY OF THE INVENTION

A system for converting a first, digital component, video signal having timing information contained therein to a second, digital composite, signal is described. The system has a decoder for extracting the timing information from the digital component signal, a digital memory for storing synchronous waveform data for the digital composite signal, a memory control for extracting data for the digital composite signal from the digital memory in response to the timing information and a multiplexing system for combining the portions of the signal extracted from the digital memory in response to timing information of the digital component signal so as to synthesize a digital composite signal containing the same video information contained in the original signal.

In an alternative embodiment, portions of both the digital component and digital composite signals are stored in a digital memory and subsequently extracted in accordance with timing information related to the original, digital component signal.

BRIEF DESCRIPTION OF THE DRAWINGS

These and other objects and advantages of the invention, as well as the details of the illustrative embodiments, will be more fully understood by reference to the following portion of the specification, taken in conjunction with the accompanying drawings, in which.

DESCRIPTION OF A PREFERRED EMBODIMENT

As a consequence of the specification of the digital component signal, the samples of the signals are available at the "line rate" of $13.5 \times 10^6$ samples/second. In accordance with the PAL digital composite standards, the samples of these signals are required at the rate of $17.734475 \times 10^6$ samples/second, corresponding to a sampling frequency of $4f_{sc}$, $f_{sc}$ being the frequency of the PAL color subcarrier. The ratio of the sample rate is 709,379/540,000 with the input and output sampling coinciding once in every 625×864 (540,000) input samples.

One way to achieve this sample rate conversion is to convert the digitally generated signal into an analog signal, using a digital-to-analog converter, and then, resample the analog signal at the desired frequency. It is very difficult to maintain a desirable degree of accuracy over the entire frequency band of interest by using this approach Digital techniques for sample-rate conversion, such as the inventive method, are therefore more appropriate. Operating on the digitized signal, the inventive method further provides the synchronization waveform to the input digital component signal. Prior art methods suggest providing the digital composite synchronization waveform to the output signal. Since, however, the output sample rate is not synchronous to the line rate of the output, every line of the output must be sampled, requiring massive storage and lookup operations. By providing synchronization to the input signal, wherein the sample rate (~13.5 MHz) is synchronous to the line rate (64 microseconds), the operation is much easier to perform. The digital component standard does not, however, provide enough dynamic range to directly insert the synchronization signal. Therefore, as part of the inventive method, the synchronization signal is inverted about the black level and inserted, thereby keeping the input signal within the allowable digital component signal range represented by 10 bits. The input signal, containing the video signal, inverted synchronization waveform and burst envelope is then interpolated to the correct output phase. The interpolated synchronization waveform is inverted at the output. The burst envelope is modulated by zeroing every other sample and inverting every fourth sample. This provides burst at the proper location (as indicated by the burst envelope). The inventive signal operations can be performed, as in the prior art, on "bins" or groups of signals to reduce the time and storage requirements. However, for superior signal interpolation results, the process can be performed on the totality of the incoming signals in an efficient manner, given the fact that it is the input signal that is manipulated.

Figure 1:
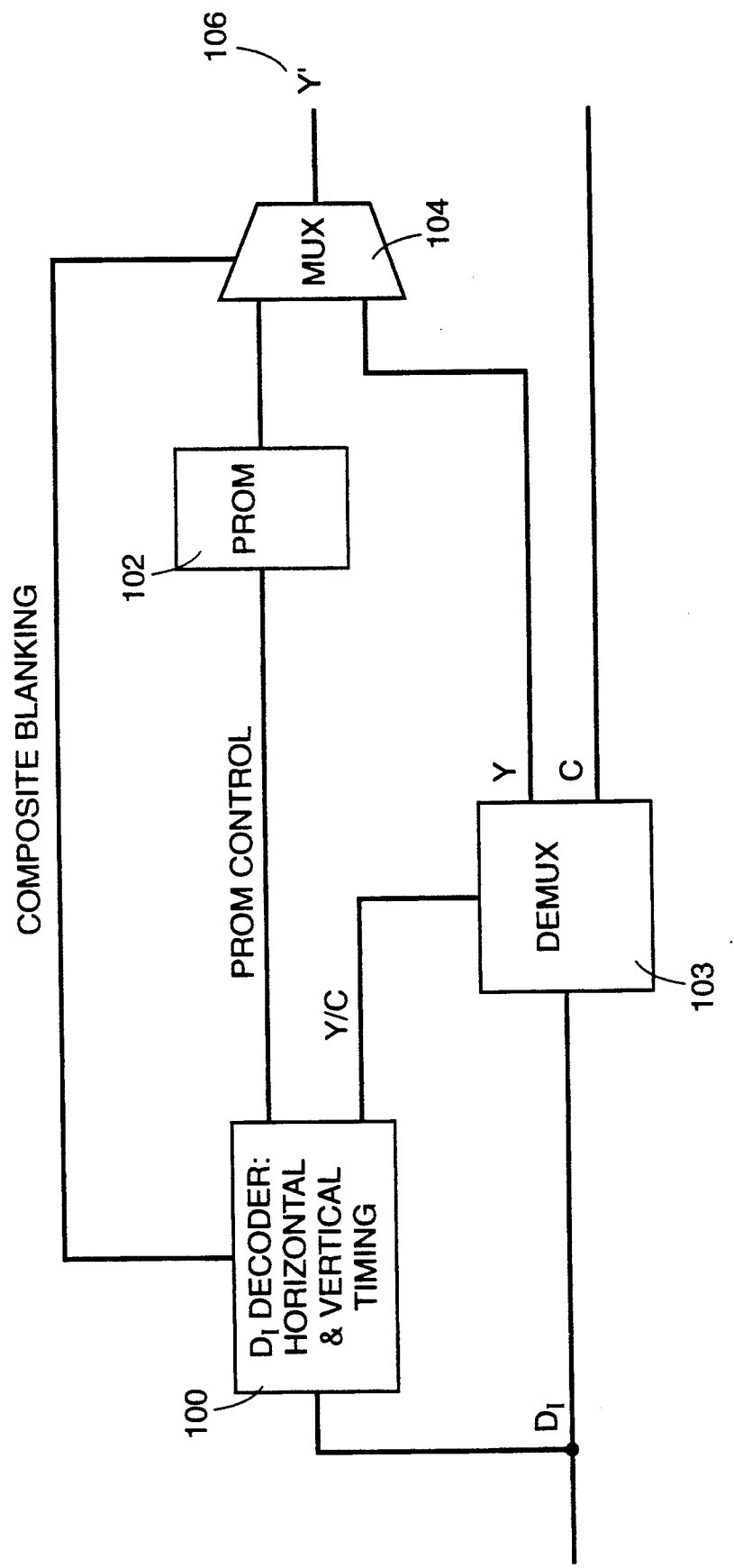
FIG. 1 is an overall conceptual block diagram of the signal conversion insertion apparatus of this invention.

FIG. 1 illustrates a system implementing the digital techniques used in the present invention. In general, decoder 100 receives the incoming digital component ($D_I$) data stream. The data stream is demultiplexed into luminance (Y) and chrominance (C) samples in demultiplexer 103 under the control of decoder 100. Furthermore, decoder 100 interprets the digital component signal synchronization pattern and outputs a composite blanking signal to multiplexer 104 as well as a PROM control signals to a programmable read only memory (PROM) 102. PROM 102 in turn outputs its digital contents to multiplexer 104. The PROM supplies the synchronization waveform of the desired digital composite signal, which is essentially overwritten onto the digital component signal. It also provides the digital composite burst location (i.e. the burst envelope) since the incoming component signal has no burst information. The combination of the luminance signal generated from demultiplexer 103 with digital values supplied by PROM 102 and the composite blanking from decoder 100 in multiplexer 104 generates a representation of the digital composite luminance signal which must be resampled by an interpolation circuit. In other words, decoder 100 controls the timing of the digital output from PROM 102 with respect to the digital component signal while also controlling the timing of the luminance signal from demultiplexer 103 and its combination with the PROM 102 signal in multiplexer 104. The invention is described with reference to operations on the luminance component of the digital component signal. It would be possible to instead perform the operations on the chrominance components. However, for the ease of description, and given the superior luminance filters available for interpolating the waveform, the preferred embodiment is, at this juncture, to operate on the luminance signal components.

PROM 102 stores the standard PAL amplitude values of the synchronization waveform and burst location, or burst envelope values, which are interpolated to the desired digital composite signal rate and inserted as part of the digital composite signal during the blanking interval. The digital data readout from PROM 102 modifies the digital component signal blanking data so that the digital synchronization and burst signal is represented in the new luminance data output 106 from multiplexer 104. After leaving multiplexer 104, the output signal Y' is interpolated to the composite signal rate ($17.734475 \times 10^6$ samples/second), inverted during sync time and modulated during burst time, and an offset is added. The offset is changed depending on whether the signal was inverted, zeroed or passed unchanged. The output signal ($D_O$) is the digital composite signal.

Figure 2:
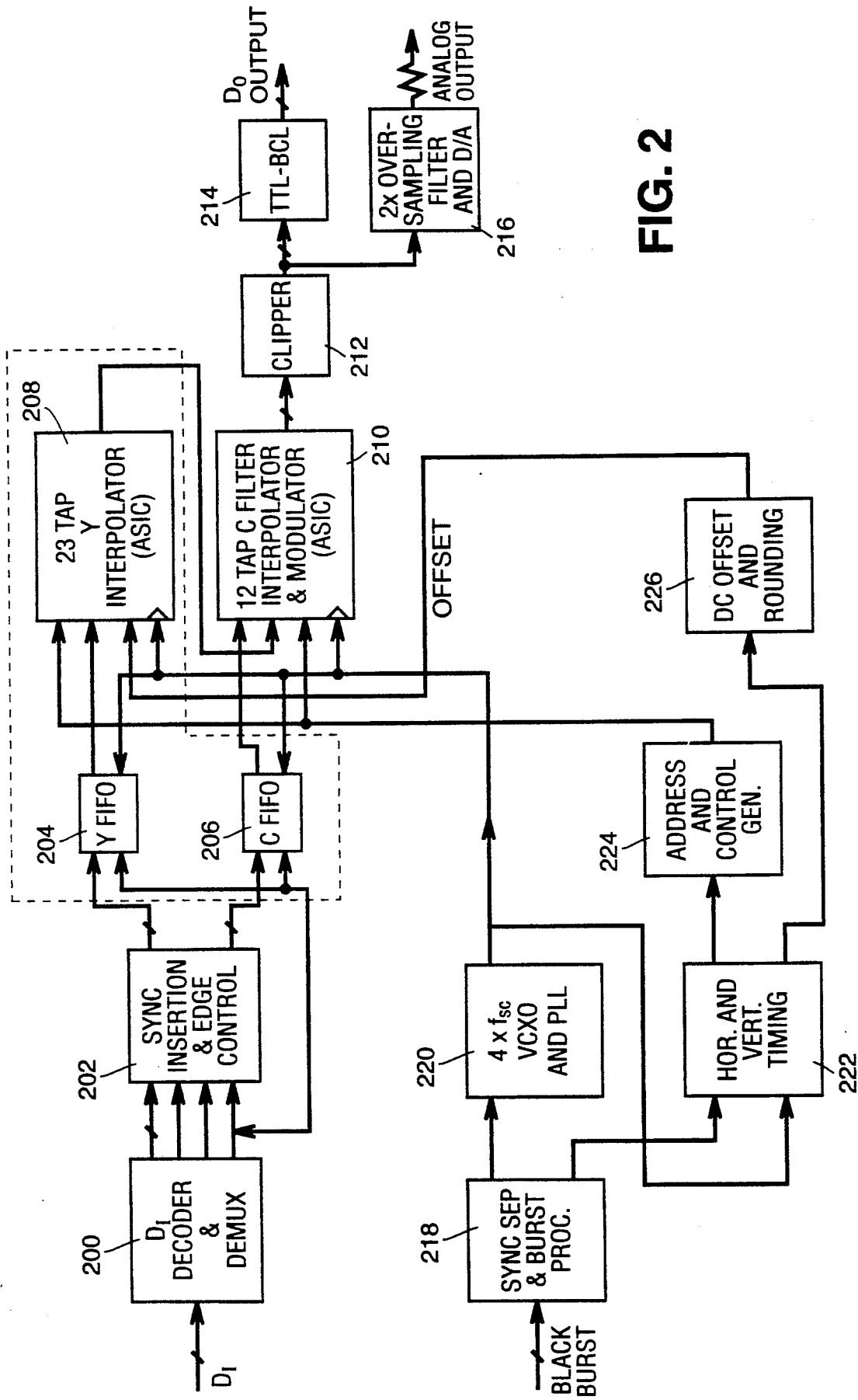
FIG. 2 is a preferred embodiment of the signal conversion apparatus of the present invention.

The system, schematically illustrated in FIG. 2, implements the general functions enumerated for FIG. 1 in a preferred embodiment of the invention. Decoder 200 is coupled to synchronization insertion and edge control unit 202 whose output is fed to luminance (Y) first in first out (FIFO) buffer 204, as well as chrominance FIFO buffer 206. Buffers 204 and 206 in turn feed 23 tap interpolator 208 and 12 tap C filter interpolator and modulator 210.

A black burst signal, created externally and independently from the digital component signal, is processed in synchronization separator and burst processor 218, which in turn operates variable voltage oscillator VCXO and its associated phase lock loop 220. The combination of signals from VCXO 220 and processor 218 drive horizontal and vertical timing circuits 222 to invert and modulate the synchronization waveform, which in turn activate address and control generator 224 as well as DC offset and rounding circuits 226. The output from circuit 226 is input to interpolator 208. The output from address and control generator 224 is also fed to interpolator 208. Another path for the output from VCXO 220 is to buffer 204 and buffer 206, which accumulate a full frame of data and reclock it from the digital component to the composite rate.

During the operation of the circuit, sync insertion and edge control unit 202 essentially provides the digital composite sync and burst information. Buffers 204 and 206 provide the timing conversion and 23 tap Y interpolator 208 and 12 tap C filter interpolator and modulator 210 perform interpolation phase shift and chroma modulation. The Decoder unit 200 performs the function of unit 100 and 103 (that is, the unit 200 also performs the demux operation). Sync insertion and edge control unit 202 performs the function of units 102 and 103. Horizontal and vertical timing circuit 222 in conjunction with address and control generator 224 provide the sync timing control function, i.e., the output of interpolators 208 and 210 respond to digital composite signal data stored in buffers 204 and 206 which are controlled by control generator 224.

The output from interpolator 208 contains the synchronization waveform information, which was inverted about the black level. As detailed in the U.S. Pat. No. 5,057,911, interpolator 208 also selectively inverts and zeros the signal. This reinverts the synchronization waveform and modulates the burst envelope. Within the interpolator, the offset is changed, depending on whether the signal was inverted, zeroed or passed unchanged (i.e. 3 offsets are needed) and the offset is added in by an adder unit in interpolator 208. Unit 210 takes the output of unit 208 and adds in the modulated chrominance data. Finally, the signal is limited by clipper 212 to insure that its dynamic range does not exceed a pre-arranged amplitude. Thus limited, the signal from interpolator and modulator 210 is translated from TTL levels to ECL levels in level translator 214, as well as being converted to analog form in a two times oversampling filter and digital to analog converter 216.

Although the present invention has been shown and described with respect to preferred embodiments, various changes and modifications which are obvious to persons skilled in the art of which the invention pertains are deemed to lie within the spirit and scope of the invention. Thus, numerous changes and modifications can be made while staying within the scope of the invention which is set forth in the appended claims.

We claim:

1. A system for converting a first video signal having timing information contained therein, to a second signal, comprising:
    a) a decoder for extracting said timing information from said first signal;
    b) a first memory means for storing one or more portions of said first video signal;
    c) a second memory means for storing one or more portions of said second signal, said portions of said second signal including synchronization and burst information;
    d) a memory control means for extracting and interpolating said portions of said first and second signal from said first and second memory means in response to said timing information; and
    e) a multiplexing means for combining said portions of said first and second signal extracted from said first and second memory in response to said timing information.

2. The system of claim 1 wherein said multiplexing means further comprises means for inverting said synchronization information.

3. The system of claim 2 wherein said second signal has a timing rate and wherein said multiplexing means comprises:
    a) means for sampling said first signal at said timing rate of said second signal.

4. The system of claim 3 wherein said multiplexing means further comprises means for providing said inverted synchronization information to said first signal.

5. A method for converting a first video signal, having timing information contained therein, to a second signal, comprising:
    a) extracting said timing information from said first signal;
    b) storing one or more portions of said first video signal in a first memory;
    c) storing one or more portions of said second video signal in a second memory, said portions of said second signal including a synchronization signal;
    d) extracting and interpolating said portions of said first and second signal from said first and second memory means in response to said timing information; and
    e) combining said portions of said first and second signal extracted from said first and second memory in response to said timing information.

6. The method of claim 5 wherein said combining step further comprises:
    a) inverting said synchronization signal; and
    b) providing said inverted signal to said first signal in response to said timing information, thereby generating an output signal.

7. The method of claim 6 wherein said portions of said second signal include burst information.

8. The method of claim 7 wherein said combining step further comprises providing signal burst information to said first signal in response to said timing information.

9. The method of claim 6 further comprising the step of inverting the output signal.

10. A method for converting a video signal from a first signal format having first timing information therein to a second signal format having a timing rate and a synchronization waveform comprising:
    a) extracting said timing information from said video signal;
    b) providing said synchronization waveform to said video signal;
    c) providing said video signal, including said synchronization waveform, as input to a means for sampling; and
    d) sampling said input video signal at second timing rate.

11. A method for converting a video signal from a first signal format having first timing information therein to a second signal format having a timing rate and burst information comprising:
    a) extracting said timing information from said video signal;
    b) providing burst information to said input signal;
    c) providing said video signal, including said burst information, as input to a means for sampling; and
    d) sampling said input video signal at second timing rate.

12. The method of claim 11 further comprising the step of modulating the burst information in response to said second signal timing rate.

* * * * *